United States Patent
Kim

(10) Patent No.: US 8,375,307 B2
(45) Date of Patent: Feb. 12, 2013

(54) MOBILE TERMINAL AND METHOD FOR MANAGING E-MAIL THEREOF

(75) Inventor: Taeyong Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 12/813,384

(22) Filed: Jun. 10, 2010

(65) Prior Publication Data

US 2010/0318923 A1 Dec. 16, 2010

(30) Foreign Application Priority Data

Jun. 11, 2009 (KR) .......................... 10-2009-0052053

(51) Int. Cl.
G06F 3/00 (2006.01)
G06F 3/048 (2006.01)

(52) U.S. Cl. ........ 715/752; 715/702; 715/751; 715/753; 715/864; 709/206; 709/207

(58) Field of Classification Search .................. 715/752, 715/702, 751, 753, 864; 709/206, 207
See application file for complete search history.

(56) References Cited

U.S. PATENT DOCUMENTS

| | | | | |
|---|---|---|---|---|
| 6,526,413 | B2 * | 2/2003 | Schwitters et al. | 707/621 |
| 6,725,228 | B1 * | 4/2004 | Clark et al. | 1/1 |
| 6,778,642 | B1 * | 8/2004 | Schmidt et al. | 379/88.13 |
| 6,871,215 | B2 * | 3/2005 | Smith et al. | 709/206 |
| 6,965,918 | B1 * | 11/2005 | Arnold et al. | 709/206 |
| 6,993,561 | B2 * | 1/2006 | Lincke et al. | 709/206 |
| 7,020,687 | B2 * | 3/2006 | Mooney et al. | 709/206 |
| 7,266,586 | B2 * | 9/2007 | Lincke et al. | 709/206 |
| 7,296,241 | B2 * | 11/2007 | Oshiro et al. | 715/778 |
| 7,590,539 | B1 * | 9/2009 | Kirkpatrick | 704/260 |
| 7,603,379 | B2 * | 10/2009 | Kang et al. | 1/1 |
| 7,707,244 | B2 * | 4/2010 | Malik et al. | 709/203 |
| 7,730,136 | B2 * | 6/2010 | Smith et al. | 709/206 |
| 7,805,489 | B2 * | 9/2010 | Roberts | 709/206 |
| 7,908,647 | B1 * | 3/2011 | Polis et al. | 726/5 |
| 7,958,099 | B2 * | 6/2011 | Kang et al. | 707/694 |

(Continued)

FOREIGN PATENT DOCUMENTS

CN 1659837 A 8/2005
CN 101087267 A 12/2007

(Continued)

Primary Examiner — Steven B Theriault
(74) Attorney, Agent, or Firm — Birch, Stewart, Kolasch & Birch, LLP

(57) ABSTRACT

A method for controlling a mobile terminal, and which includes executing, via a controller on the mobile terminal, an e-mail function; displaying, via a display on the mobile terminal, a e-mail account list including at least first and second e-mail accounts, in which the first e-mail account uses a first e-mail service for processing e-mails and the second e-mail account uses a second e-mail service for processing e-mails that is different than the first e-mail account service; providing, via the controller, an e-mail service of the selected first e-mail account, when the first e-mail account on the e-mail account list is selected; receiving, via an input unit, an account changing request for changing from the first e-mail account to the second e-mail account while information within the first e-mail account is currently being displayed; changing, via the controller, from the first e-mail account to the second e-mail account according to the account changing request; and providing, via the controller, the second e-mail service for the second e-mail account.

12 Claims, 9 Drawing Sheets

U.S. PATENT DOCUMENTS

| | | | |
|---|---|---|---|
| 8,060,634 B1 * | 11/2011 | Darnell et al. | 709/231 |
| 8,108,469 B2 * | 1/2012 | Kent et al. | 709/206 |
| 2002/0091774 A1 * | 7/2002 | Imamura et al. | 709/206 |
| 2002/0130904 A1 * | 9/2002 | Becker et al. | 345/753 |
| 2003/0020749 A1 * | 1/2003 | Abu-Hakima et al. | 345/752 |
| 2003/0231207 A1 * | 12/2003 | Huang | 345/752 |
| 2004/0054735 A1 * | 3/2004 | Daniell et al. | 709/206 |
| 2004/0122905 A1 * | 6/2004 | Smith et al. | 709/206 |
| 2004/0172455 A1 * | 9/2004 | Green et al. | 709/207 |
| 2005/0080851 A1 * | 4/2005 | Kent et al. | 709/205 |
| 2005/0080862 A1 * | 4/2005 | Kent et al. | 709/206 |
| 2005/0188320 A1 * | 8/2005 | Bocking | 715/752 |
| 2006/0009243 A1 | 1/2006 | Dahan et al. | |
| 2006/0084450 A1 * | 4/2006 | Dam Nielsen et al. | 455/466 |
| 2007/0088786 A1 * | 4/2007 | Hardy et al. | 709/206 |
| 2007/0299918 A1 * | 12/2007 | Roberts | 709/206 |
| 2008/0109552 A1 * | 5/2008 | Tamir et al. | 709/229 |
| 2008/0174570 A1 * | 7/2008 | Jobs et al. | 345/173 |
| 2008/0256202 A1 * | 10/2008 | Williams et al. | 709/206 |
| 2009/0093242 A1 * | 4/2009 | Bhalekar et al. | 455/418 |
| 2009/0138562 A1 * | 5/2009 | Schmulen et al. | 709/206 |
| 2009/0204680 A1 * | 8/2009 | Kirkpatrick | 709/206 |
| 2009/0210823 A1 * | 8/2009 | Bocking | 715/821 |
| 2009/0228792 A1 * | 9/2009 | van Os et al. | 715/702 |
| 2009/0228807 A1 * | 9/2009 | Lemay | 715/752 |
| 2009/0305732 A1 * | 12/2009 | Marcellino et al. | 455/466 |
| 2009/0327972 A1 * | 12/2009 | McCann et al. | 715/853 |
| 2010/0041382 A1 * | 2/2010 | Van Os et al. | 455/418 |
| 2010/0081423 A1 * | 4/2010 | Knight | 455/422.1 |
| 2010/0159967 A1 * | 6/2010 | Pounds et al. | 455/466 |
| 2010/0250681 A1 * | 9/2010 | Van Wely | 709/206 |
| 2010/0318923 A1 * | 12/2010 | Kim | 715/752 |

FOREIGN PATENT DOCUMENTS

| | | |
|---|---|---|
| EP | 1 775 924 A1 | 4/2007 |
| WO | WO 2006/010156 A1 | 1/2006 |

* cited by examiner

FIG. 2
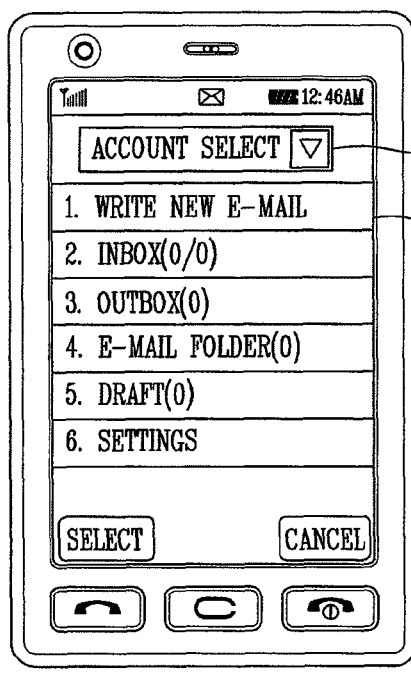
(a)
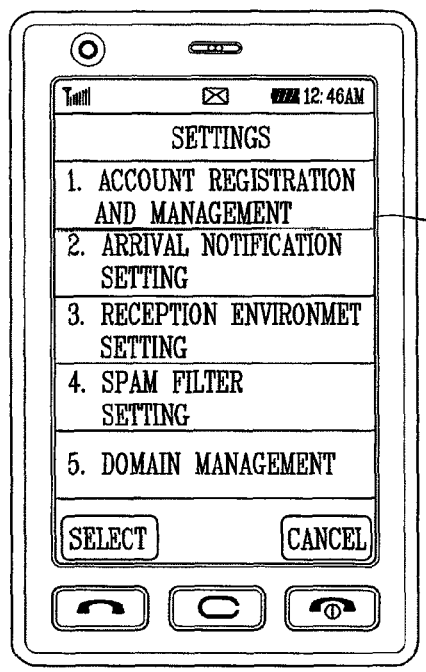
(b)
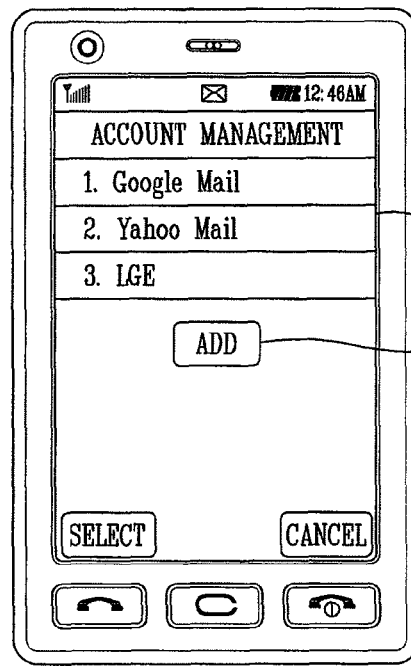
(c)
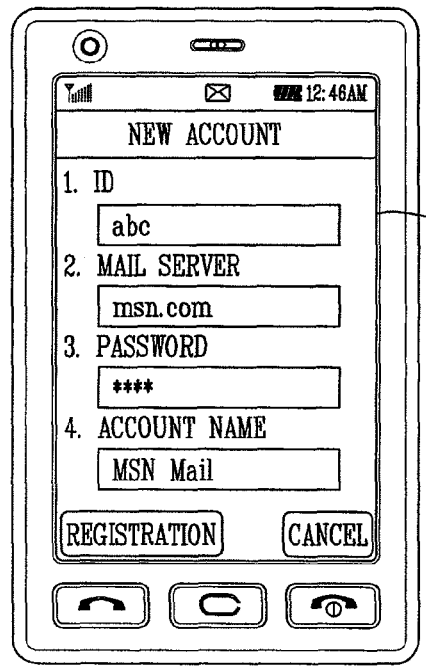
(d)

FIG. 3
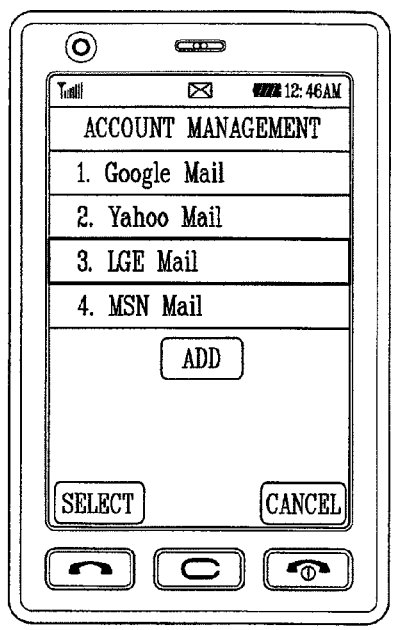
(a)
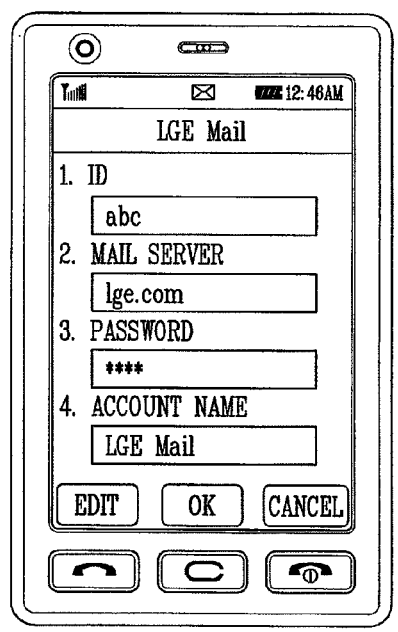
(b)
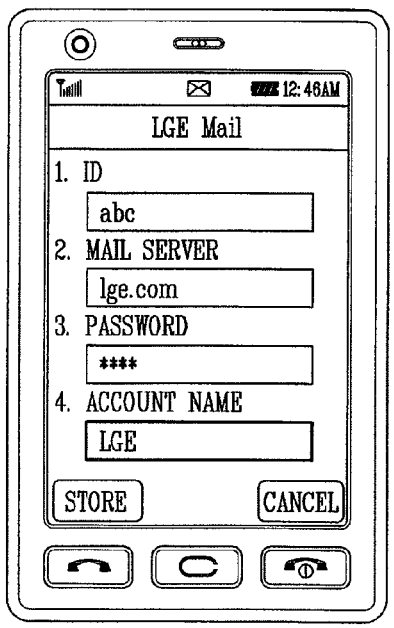
(c)
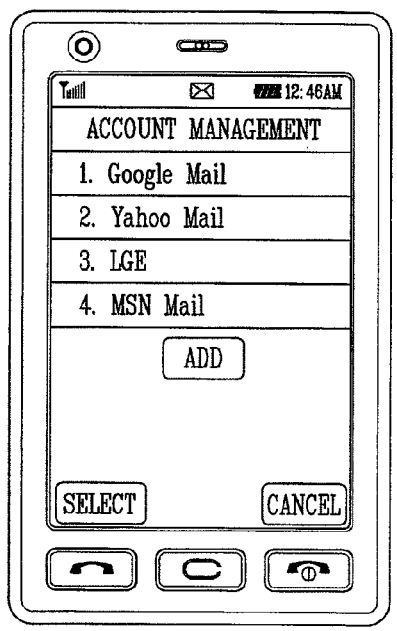
(d)

FIG. 5
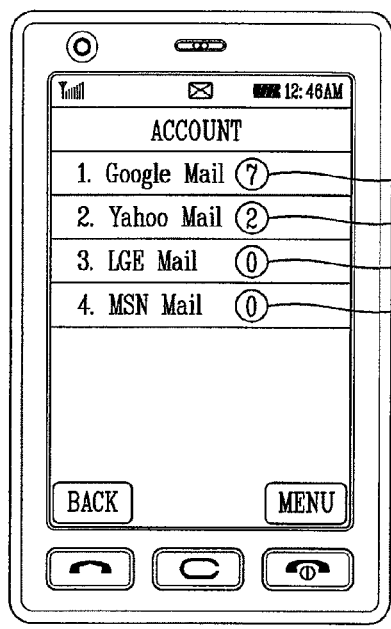
(a)
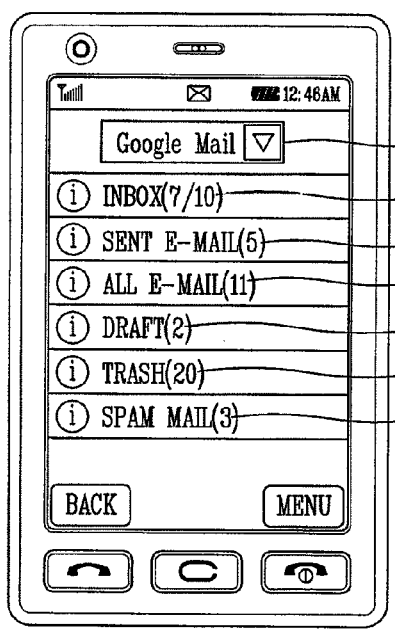
(b)
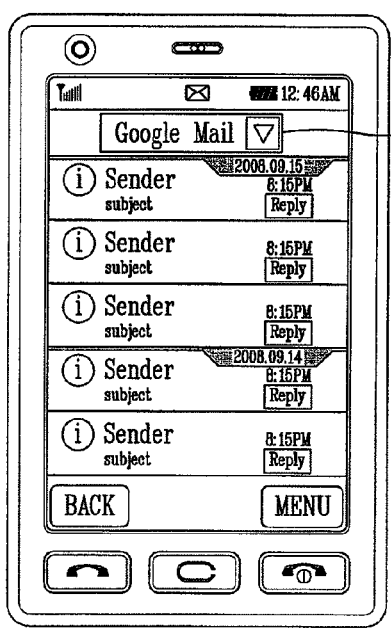
(c)

FIG. 6
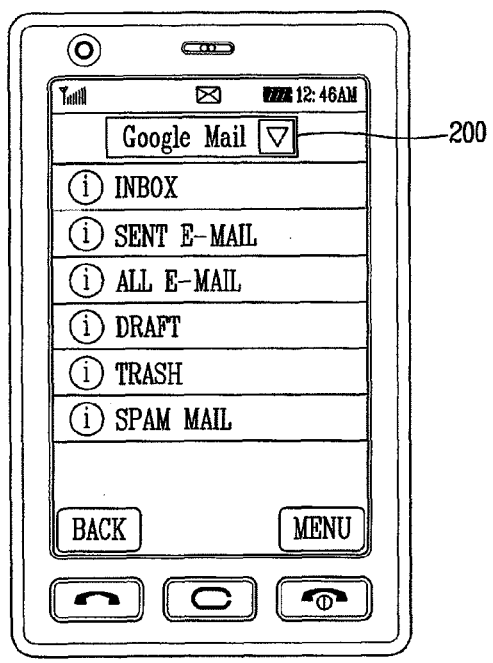
(a)
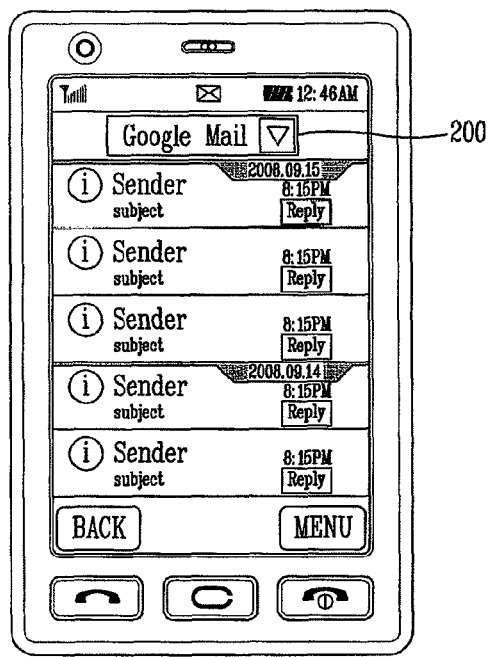
(b)
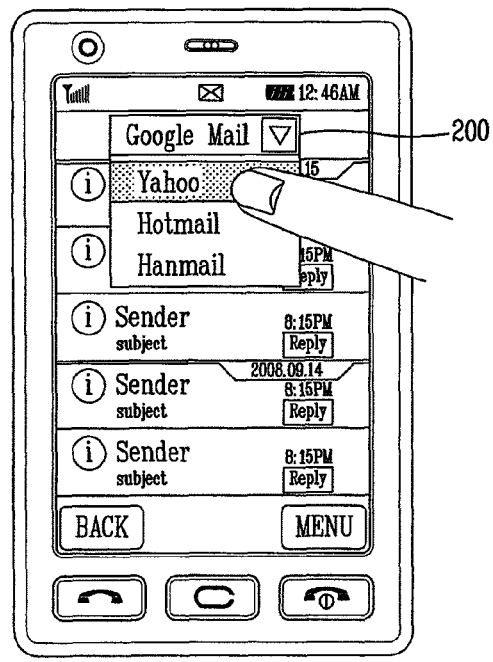
(c)
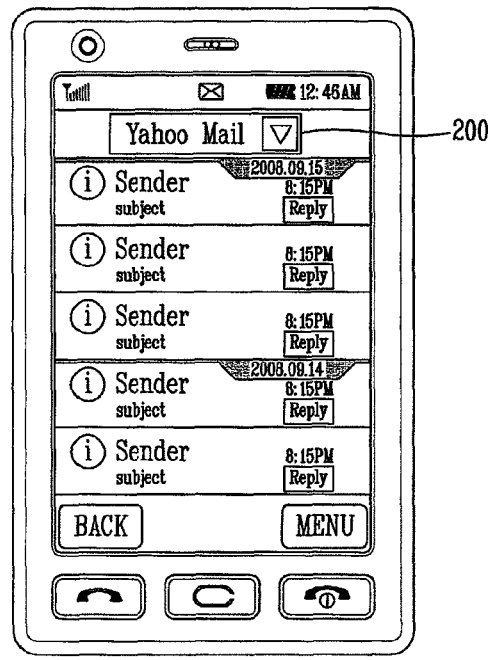
(d)

FIG. 7
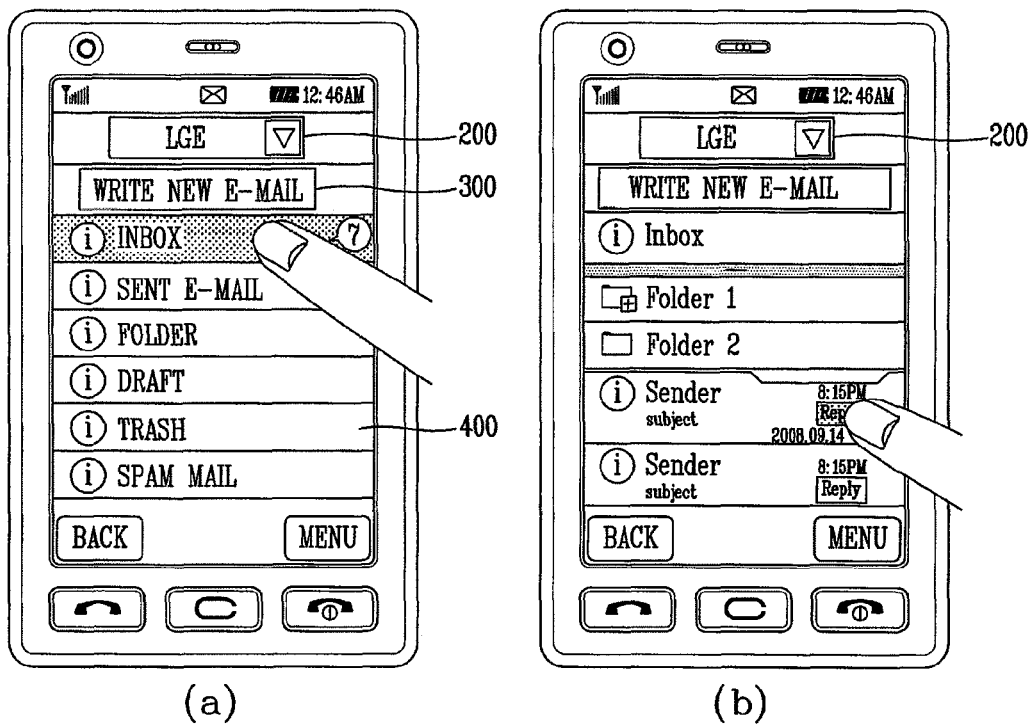
(a) (b)
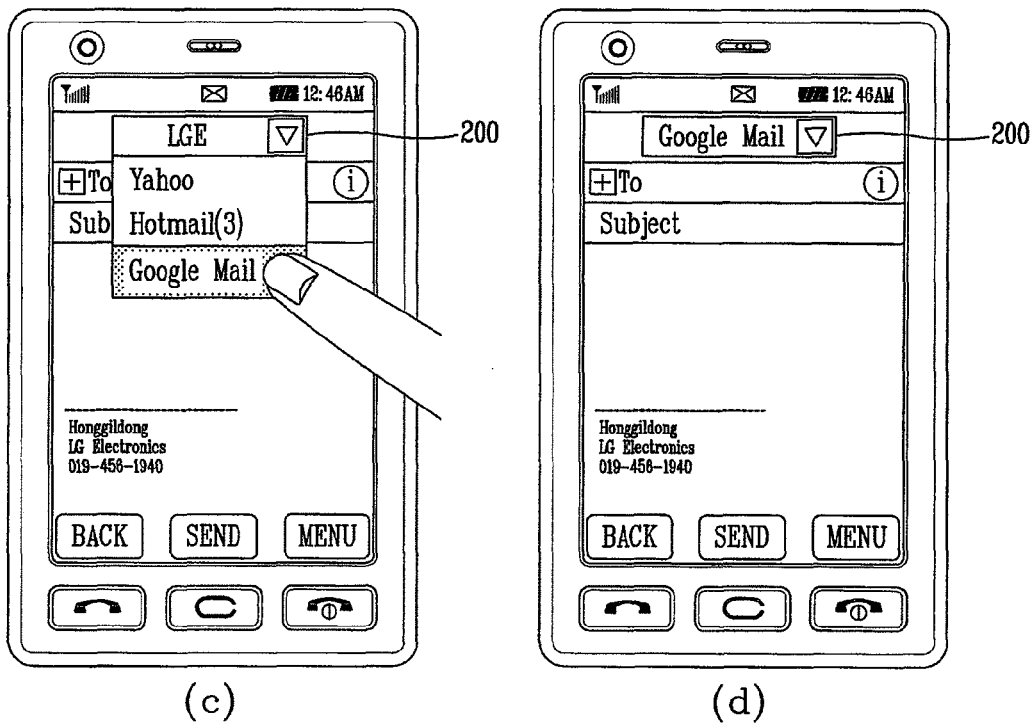
(c) (d)

MOBILE TERMINAL AND METHOD FOR MANAGING E-MAIL THEREOF

CROSS REFERENCE TO RELATED APPLICATIONS

The present application claims priority to Korean Application No. 10-2009-0052053 filed in Korea on Jun. 11, 2009, the entire contents of which is hereby incorporated by reference in its entirety.

BACKGROUND OF THE INVENTION

1. Field of the Invention

The present invention relates to a mobile terminal for changing to a different account while managing an e-mail of a particular account through an account change interface, and a method for managing an e-mail thereof.

2. Description of the Related Art

Terminals such as personal computers, notebook computers, mobile phones, and the like may be configured to perform various functions. Examples of such functions of terminals may include a data and voice communication function, a function of capturing images or video through a camera, a voice storage function, a function of reproducing music files through a speaker system, a function of displaying images or video, and the like. Some terminals include an additional function of playing games, while other terminals are implemented as multimedia players. Recently, terminals receive a broadcast or multicast signal to allow users to view video or television programs.

In general, terminals may be divided into a mobile terminal and stationary terminal according to whether or not terminals are movable. In addition, mobile terminals may be divided into a handheld terminal and a vehicle mount terminal according to whether or not users can directly carry it around.

As the use of mobile terminals is generalized, users can check and transmit an e-mail, or the like, through mobile terminals like they do with personal computers. Thus, efforts are ongoing to provide a user interface allowing users to more conveniently manage e-mails in mobile terminals.

SUMMARY OF THE INVENTION

Accordingly, one object is to provide a mobile terminal capable of managing a plurality of e-mail accounts, and a method for managing e-mails of the mobile terminal.

Another object of the present invention is to provide a mobile terminal providing a user interface for changing between e-mail accounts, and a method for managing e-mails of the mobile terminal.

To achieve these and other advantages and in accordance with the purpose of the present invention, as embodied and broadly described herein, the present invention provides in one aspect a method for managing e-mails of a mobile terminal, including: executing an e-mail function; when the e-mail function is executed, displaying a mail account list including two or more mail accounts; when a first account on the mail account list is selected, providing an e-mail service of the selected first account; receiving a request for changing to a second account that uses a mail service whose method for accessing a received mail is different from that of the first account; changing from the first account to the second account according to the account changing request; and providing an e-mail service of the changed second account.

To achieve these and other advantages and in accordance with the purpose of the present invention, as embodied and broadly described herein, the present invention provides in another aspect a method for managing e-mails of a mobile terminal, including: checking a mail received by a first account; detecting an account changing request while a return mail of the received mail is being created; when the account changing request is detected, displaying a previously registered account list; selecting a second account that uses a mail service whose method for accessing a received mail is different from that of the first account from the display account list; changing to the selected second account; and when creating of the return mail is completed, transmitting the created return mail through the changed second account.

To achieve these and other advantages and in accordance with the purpose of the present invention, as embodied and broadly described herein, the present invention provides in still another aspect a mobile terminal including: a wireless communication unit configured to transmit or receive an e-mail through one of a plurality of previously registered accounts; and a controller configured to provide an e-mail service of a second account that uses a mail service whose method for accessing a received mail is different from that of a first account, when changing to the second account is requested while an e-mail service of the first account, among the plurality of accounts is in use.

According to the exemplary embodiments of the present invention, a single mobile terminal can manage a plurality of e-mail accounts.

In addition, while an e-mail of a particular account is being managed, the particular account to be easily changed to a different account through an account changing interface such as a drop=down list, a list box, a combo box, and the like.

Also, a return mail with respect to an e-mail which has been received by a particular account can be transmitted through a different account through the account changing interface.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 2 is an overview of display screens illustrating the process of registering an account of the mobile terminal according to an exemplary embodiment of the present invention;

FIG. 3 is an overview of display screens illustrating a method for managing an account of the mobile terminal according to an exemplary embodiment of the present invention;

FIG. 5 is an overview of display screens illustrating e-mail function executions of the mobile terminal according to an exemplary embodiment of the present invention;

FIG. 6 is an overview of display screens illustrating a method for checking a received e-mail of the mobile terminal according to an exemplary embodiment of the present invention;

FIG. 7 is an overview of display screens illustrating a method for transmitting a return e-mail of the mobile terminal according to an exemplary embodiment of the present invention.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

Figure 1:
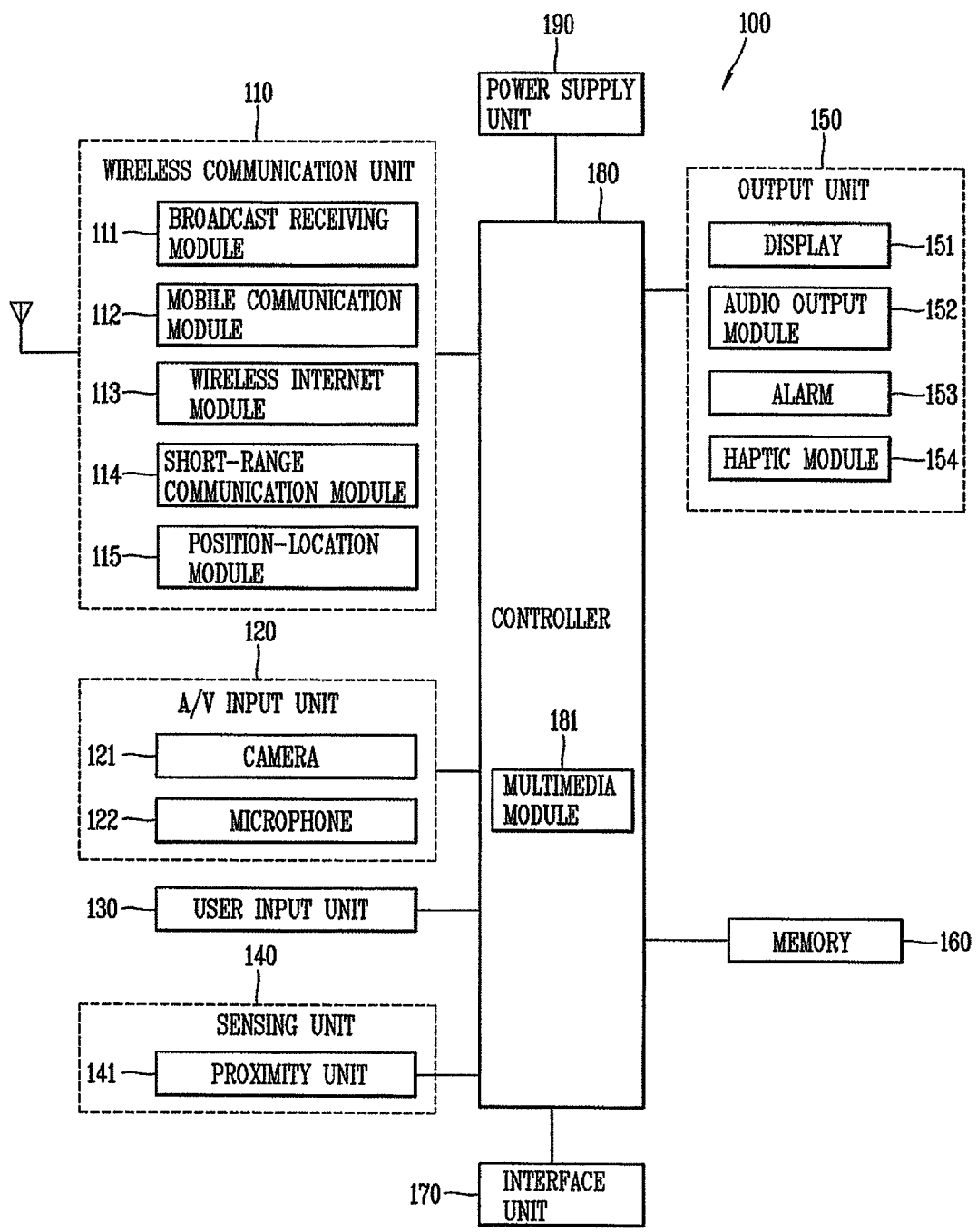
FIG. 1 is a schematic block diagram of a mobile terminal implementing an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The controller 180 acquires current location information of the mobile terminal 100 through the location information module 115, and transmits the acquired location information to a server providing a location-based service (LBS) (referred to as an IBS providing server', hereinafter). The LBS includes GyPSii, Dodgeball, Brightkite, and the like. The LBS providing server stores the location information received from the mobile terminal in a database to keep it.

Also, the controller 180 acquires current location information through the location information module 115 at every certain period and transmits the acquired location information to the LBS providing server. Alternatively, whenever there is a request from the LBS providing server, the controller 180 may acquire location information through the location information module 115 and transmits it to the LBS server.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

FIG. 2 is an overview of display screens illustrating the process of registering an account of the mobile terminal according to an exemplary embodiment of the present invention.

First, when the user selects an e-mail menu (i.e., electronic mail menu) from top menu items through menu manipulation, the controller 180 of the mobile terminal 100 executes an e-mail function and displays sub-menu items as shown in FIG. 2(a).

When the user selects an environment setting from among the displayed sub-menu items, the controller 180 displays sub-menu items of the environment setting on the display unit 151 as shown in FIG. 2(b). When an 'account registration and management' item is selected from among the displayed sub-menu items of the environment setting, the controller 180 searches the memory 160 to check whether there is an account which has been previously registered.

Upon checking, if there is an account which has been previously registered, the controller 180 displays a list of previously registered accounts on the display screen as shown in FIG. 2(c).

When an account addition command is inputted through the user input unit 130 on the account management screen displaying the previously registered account list, the controller 180 displays an account registration screen image allowing for registration of a new account as shown in FIG. 2(d). When the user inputs account information required for an account registration by manipulating the user input unit on the account registration screen image and then inputs a registration (OK) button, the controller 180 registers the inputted account information. In other words, the controller 180 stores the inputted account information in the memory 160. The account information includes an account name, an ID, a password, a main server (e.g., a mail server to which an e-mail is sent, a mail server from which an e-mail is received, etc.), and the like.

Also, when a registration of the inputted account information is requested, the controller 180 transmits the inputted account information to the corresponding mail server for an approval procedure. The mail server checks whether or not there is an account of the received account information. Here, if an approval of the account desired to be registered is rejected, the mail server transmits the approval procedure performing results along with a rejection reason to the mobile terminal 100.

The mail server may provide a polling e-mail service using a protocol such as a post office protocol (POP) or a push e-mail service using a protocol such as an Internet message access protocol (IMAP). The polling e-mail service is a service allowing the terminal to access the mail server at every certain period to check whether or not there is a newly received mail. If there is a newly received mail in the mail server, the terminal downloads the corresponding mail to a mail box of the terminal. The push e-mail service is a service by which when the mail server receives a new mail, the mail server automatically transmits the received mail to the terminal or informs the terminal that the new mail has been received, so that the terminal can download the new mail. That is, the push e-mail service allows for real time mail checking. In other words, the push e-mail service allows for synchronization of the mail box (or a reception box) of the terminal and the mail box of the mail server. According to the push e-mail service, when the newly received mail is checked by the user via his mobile terminal, such newly received mail may be processed also in the mail server in a state of being read (i.e. the mail server also processes the newly received e-mail in its "read" state).

Meanwhile, upon checking, if there is an account that has been previously registered, the controller 180 may immediately change an operation mode to an account registration mode in which a new account can be registered. Namely, the controller 180 may immediately display an account registration screen image allowing for inputting account information to be registered as shown in FIG. 2(d), without executing the account management screen image displaying the account list illustrated in FIG. 2(c).

When the account registration is completed, the controller 180 adds the registered account to the account list. Subsequently, the controller 180 may display the updated account list or display the registered account information to allow the user to confirm the registered account information.

FIG. 3 is an overview of display screens illustrating a method for managing an account of the mobile terminal according to an exemplary embodiment of the present invention.

First, when the previously registered account information needs to be corrected, the user selects the account management menu through menu manipulation. The controller 180 of the mobile terminal displays the registered account list on the display screen according to the user input as shown in FIG. 3(a). In this case, when the controller 180 displays the account list, it arranges the account list by an account registration date and/or an account name. Alternatively, the user may determine the arrangement order as desired.

When one of the displayed accounts on the list is selected, the controller 180 access information regarding the selected account and displays the same on the display screen as shown in FIG. 3(b).

Upon checking the account information displayed on the display screen, if the account information needs to be corrected, the user may input an editing command through the user input unit 130. For example, when an editing request is inputted while the selected account information is being displayed on the display screen, the controller 180 changes the operation mode of the terminal into an editing mode in which the corresponding account information can be edited as shown in FIG. 3(c).

When the user corrects information desired to be corrected in the changed editing mode and then presses an OK button, the controller 180 updates the corresponding account information with the corrected account information. For example, when the user wants to change an account name, the user may select a text box for inputting an account name in the account editing mode and inputs a new, desired account name (e.g., LGE) as shown in FIG. 3(c). When the inputting of the new account name is completed, the user may press a storage button (e.g., the OK button) and the controller 180 stores the new account information which has been changed according to the user input in the memory 160.

When the editing of the account information is completed, the controller 180 displays the new account information on the display screen for user confirmation or changes the editing screen image into an account management screen image displaying the account list as shown in FIG. 3(d).

Figure 4:
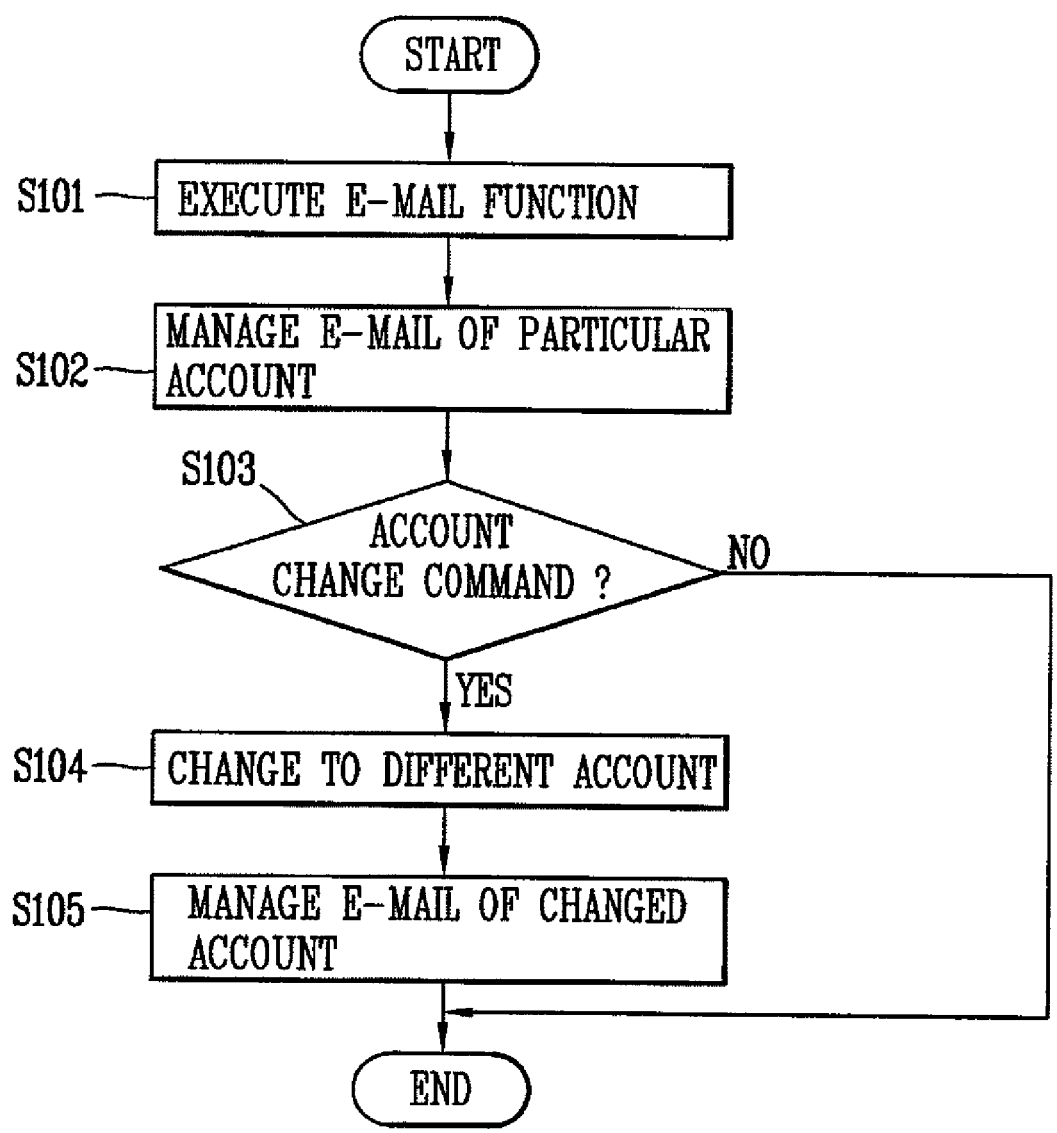
FIG. 4 is a flow chart illustrating the process of a method for managing an e-mail of a mobile terminal according to an exemplary embodiment of the present invention.

FIG. 4 is a flow chart illustrating the process of a method for managing an e-mail of a mobile terminal according to an exemplary embodiment of the present invention.

First, the controller 180 executes the e-mail function according to a user's menu manipulation (S101). Namely, when the e-mail function such as e-mail creation or checking is desired to be used, the user may select the e-mail menu from among the main menus by manipulating the user input unit 130. The controller 180 executes the e-mail function (menu) according to the user input. And then, the controller 180 displays the executed screen image on the display screen. The executed screen image includes sub-menu items, an account changing interface, and the like. The account changing interface may be implemented as a down-drop list, a list box, a combo box, and the like. The sub-menu items may include a mail box list such as a sent e-mail storage (outbox), received e-mail storage (inbox), draft (temporary box), e-mail storage (saved box, folder), personal e-mail storage (personal box). The personal mail box may include one or more directories (folders) generated by the user.

An e-mail of a particular account is managed by using the executed e-mail function (S102). The e-mail management refers to checking an e-mail received by the particular account, creating a return mail with respect to the checked e-mail, writing a new e-mail, deleting an e-mail, storing an e-mail, moving an e-mail to a different folder, delivering an e-mail, and the like. For example, when the 'inbox' menu is selected from among the sub-menu items on the e-mail executed screen image, the controller 180 downloads mails which have been received by the mail box of the corresponding account from the mail server of the currently selected account and displays the mail list. When one of the displayed mails on the list is selected, the controller 180 displays the selected mail on the display unit 151 so that the user can read it. Here, after the 'inbox' menu is selected, when only the list of the mails received by the mail box or only header information of the mails is desired to be downloaded and one of the mails on the list is selected to be read by the user, the controller 180 may download the corresponding mail text and display it.

When the account changing command is inputted while the e-mails of the particular account are being managed, the controller 180 changes the account according to the inputted control command (S103 and S104). In other words, in a state that the e-mail function is executed, the controller 180 checks whether or not the account changing interface. When the account changing interface is inputted, the controller 180 recognizes the account changing request and displays a registered account list. When one of the registered accounts, using an e-mail service different from the e-mail service for the account in use, on the list is selected, the controller 180 changes to the selected account. Here, the e-mail service is discriminated into the polling e-mail service and the push e-mail service according to how the received e-mails stored in the mail server are accessed.

For example, when the user wants to check a received e-mail in a B account while checking a received e-mail of an A account, the user may select a drop-down list, an account changing interface. Then, the controller 180 displays the account list registered to the drop-down list. And then, when the B account is selected from the displayed account list, the controller 180 releases the connection with a mail server of the A account and establishes a connection to a mail server of the B account. Here, the mail server of the A account may support the polling mail service and the mail server of the B account may support the push mail service. Alternatively, the mail server of the A account may support the push mail service and the mail server of the B account may support the polling mail service.

The controller 180 receives mail box information of the corresponding account from the mail server of the changed account and displays the same on the display screen (S104). Namely, the controller 180 transmits a message for requesting downloading mail box information along with the account information to the mail server of the changed account. The mail server performs an authentication procedure through the received account information. When the corresponding account is valid, the mal server transmits the mail box information to the mobile terminal 100 in response to the request. The controller 180 receives the changed mail box information from the mail server and updates the previous mail box information. In other words, the controller 180 downloads the mail received by the mail box of the mail server through the wireless communication unit 110.

FIG. 5 is an overview of display screens illustrating e-mail function executions of the mobile terminal according to an exemplary embodiment of the present invention.

When the 'menu' button of the user input unit 130 is pressed, the controller 180 displays top menus (main menus). When the 'e-mail' menu among the displayed top menus is selected, the controller 180 executes the e-mail function and displays the executed screen image on the display unit 151.

For example, when the e-mail function is selected by the user, the controller 180 executes the selected e-mail function and displays the list of previously registered accounts. In this case, the controller 180 drives the wireless Internet module 113 to access the mail servers of the previously registered accounts immediately when it executes the e-mail function. When the mail servers of the respective accounts are accessed, the controller 180 receives mail box information of the corresponding accounts from the mail servers through the wireless Internet module 113. And then, the controller 180 displays the mail box information together on the displayed account list. For example, as shown in FIG. 5(a), the controller 180 displays the number of newly received mails of each account as icons 205a to 205d at one side of each name of the corresponding accounts based on the mail box information received from the mail servers of the respective accounts.

With reference to FIG. 5(b), when an execution command of the e-mail function is inputted, the controller 180 of the mobile terminal 100 identifies an account set as a main account among the previously registered accounts. Here, the main account may be set through menu manipulation by the user or may be set as an account which was first registered.

When the set account is identified, the controller 180 accesses the mail server of the set account through the wireless communication unit 110. Subsequently, the controller 180 receives mail box information of the corresponding account from the mail server. When the transferring of the mail box information is completed, the controller 180 displays the total mail number 206a to 206f stored in each mail box based on the received mail box information.

For example, when there are seven newly received e-mails and three previously received e-mails, the controller 180 displays the total number of mails and/or the total number of newly received mails 206a at one side of the 'inbox' item.

Also, the controller 180 displays the account changing interface 200 at one side of the executed screen image displayed on the display unit 151. The name of the account currently displayed is displayed on the account changing interface 200.

With reference to FIG. 5(c), when the e-mail function is selected by the user, the controller 180 displays the executed screen image of the e-mail function which has been executed most recently. For example, when the e-mail function is terminated while the mail list stored in the reception mail box of a 'Google Mail' account, the controller 180 records information regarding the operation of the terminal executed at the point of time when the e-mail function is terminated. Thereafter, when the execution of the e-mail function is requested again, the controller 180 returns to the screen image and operational state at the point of time when the e-mail function was terminated based on the recorded information. Namely, the controller 180 displays the list of mails stored in the reception mail box of the 'Google Mail' account. In this case, the controller 180 accesses the mail server of the 'Google Mail' account to check whether or not there is a newly received e-mail. If there is a newly received e-mail, the controller 180 downloads it from the mail server and adds it to the reception mail list.

FIG. 6 is an overview of display screens illustrating a method for checking a received e-mail of the mobile terminal according to an exemplary embodiment of the present invention.

With reference to FIG. 6, the controller 180 executes the e-mail function according to a user input, and displays the executed screen image on the display screen as shown in FIG. 6(*a*). When the user selects a desired account by manipulating the account changing interface 200 on the executed screen image and selects a 'Inbox' item, the controller 180 displays the list of e-mails received by the account selected by the user on the display screen as shown in FIG. 6(*b*). For example, the controller 180 accesses the mail server of the selected 'Google Mail' account through the wireless communication unit 110 and receives information regarding the mail box. And then, the controller 180 displays the list of received e-mails stored in the 'Inbox' mail box based on the mail box information transferred from the mail server. Here, the mail box information may include the number of e-mails, an e-mail list, e-mails(files), and the like, stored in the respective mail boxes.

If the user wants to check e-mails received by a different account while checking the received e-mail list of the 'Google Mail' account, the user may select the desired account by manipulating the account changing interface 200 as shown in FIG. 6(*c*). For example, when the user selects the account changing interface 200, the controller 180 displays the registered account list in the form of a drop-down list. Then, the user may select a desired account from among the list of the displayed accounts.

When the desired account is selected, the controller 180 changes to the selected account and displays the list of mails received by the corresponding account as shown in FIG. 6(*d*). For example, when one account 'Yahoo Mail' is selected from among the accounts displayed on the down-drop list, the controller 180 downloads the e-mails stored in the mail box from a mail server of the selected account through the wireless communication unit 110 and displays the list of the mails. Thereafter, when one of the mails on the list is selected, the controller 180 displays the selected mail on the display screen.

FIG. 7 is an overview of display screens illustrating a method for transmitting a return e-mail of the mobile terminal according to an exemplary embodiment of the present invention.

With reference to FIG. 7, the user may select the reception mail box by sequentially manipulating the menus in order to check an e-mail received by a particular account. The controller 180 executes the e-mail function according to the user input and displays an executed screen image of the e-mail function on the display unit 151. The executed screen image may include the account changing interface 200, a mail creation interface 300, and a mail box list 400 as shown in FIG. 7(*a*).

With the e-mail function executed, when the user wants to check e-mails received by the particular account, he may select the 'Inbox' item. Then, the controller 180 displays the list of e-mails received by the particular account. In this case, the controller 180 may display every received e-mail list, and may display a folder list and an e-mail list stored in one of folders on the folder list. The folder may be generated through synchronization with the mail server or may be generated according to a user input via the mobile terminal 100. When one of the folders on the folder list is selected, the controller 180 displays an e-mail list stored in the selected folder. When one of the displays e-mails on the e-mail list is selected, the controller 180 accesses the selected e-mail and displays the same on the display screen.

Meanwhile, when the user wants to send a return mail with respect to one of the displayed mails on the e-mail list, the user may press a return mail button. Then, the controller 180 changes the operation mode to the mail creation mode in which a return mail may be created according to a user input as shown in FIG. 7(*c*). Also, the controller 180 inserts data inputted from the user input unit 130 to a text input window of the mail creation screen image in the mail creation mode.

When a different account to be used for the e-mail transmission is selected by manipulating the account changing interface 200 in the mal creation mode, the controller 180 sets an e-mail address of the selected account as a sender. For example, when the 'Google Mail' account is selected through the account changing interface 200 while the return mail is being created with respect to the e-mail received by an in-house mail account 'LGE', the controller 180 sets the selected account as an account to which the return mail is to be sent as shown in FIG. 7(*d*).

Thereafter, when the creating of the return mail is completed, the user presses a send button. Then, the controller 180 transmits the created return mail through the mail server of the selected account. The controller 180 stores the transmitted return mail in the mail box of the selected account. Also, the controller 180 stores the transmitted return mail in the mail box of the mail server of the selected account.

In the above-described exemplary embodiment, the account changing interface is separately provided to the message creation screen image. However, the present invention is not limited thereto. That is, when an area, on which sender information is displayed, which has been interrupted such that an HTML (HyperText Markup Language) editing is not possibly performed in the message creation screen image, is selected, the list of changeable accounts may be displayed on a pop-up window so that the user can select a certain account among the displayed account list.

Figure 8A:
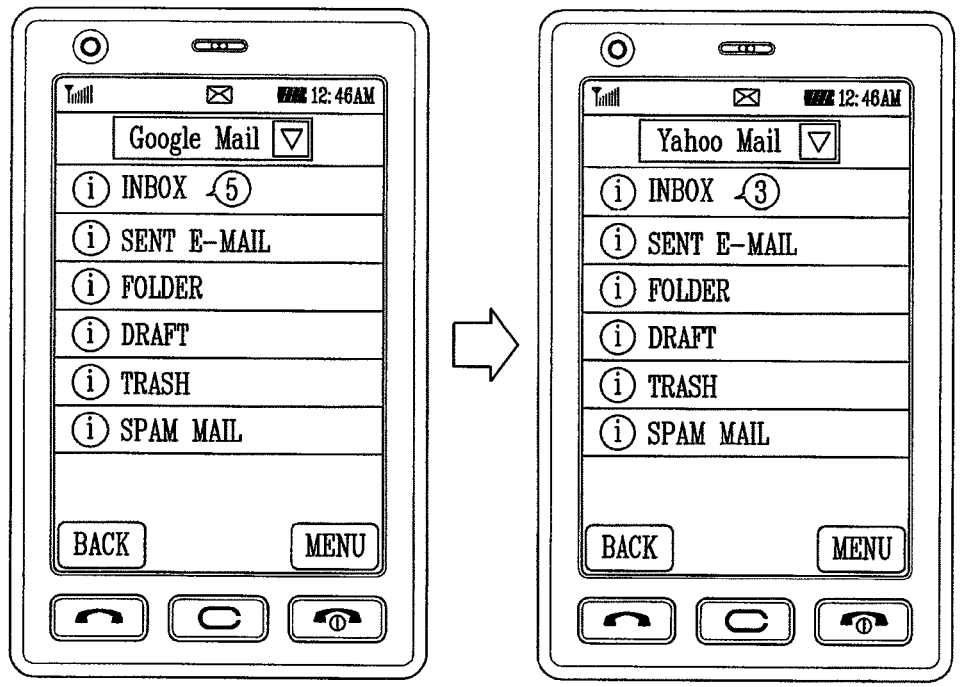
FIGS. 8a to 8c are overviews of display screens illustrating e-mail management of the mobile terminal according to an exemplary embodiment of the present invention.
Figure 8B:
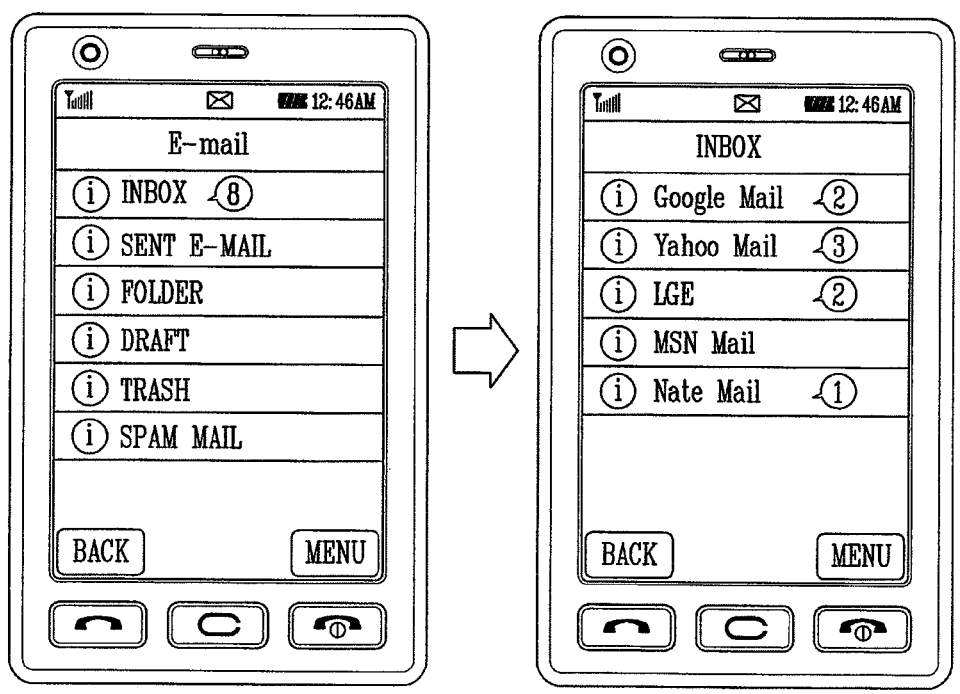
Figure 8C:
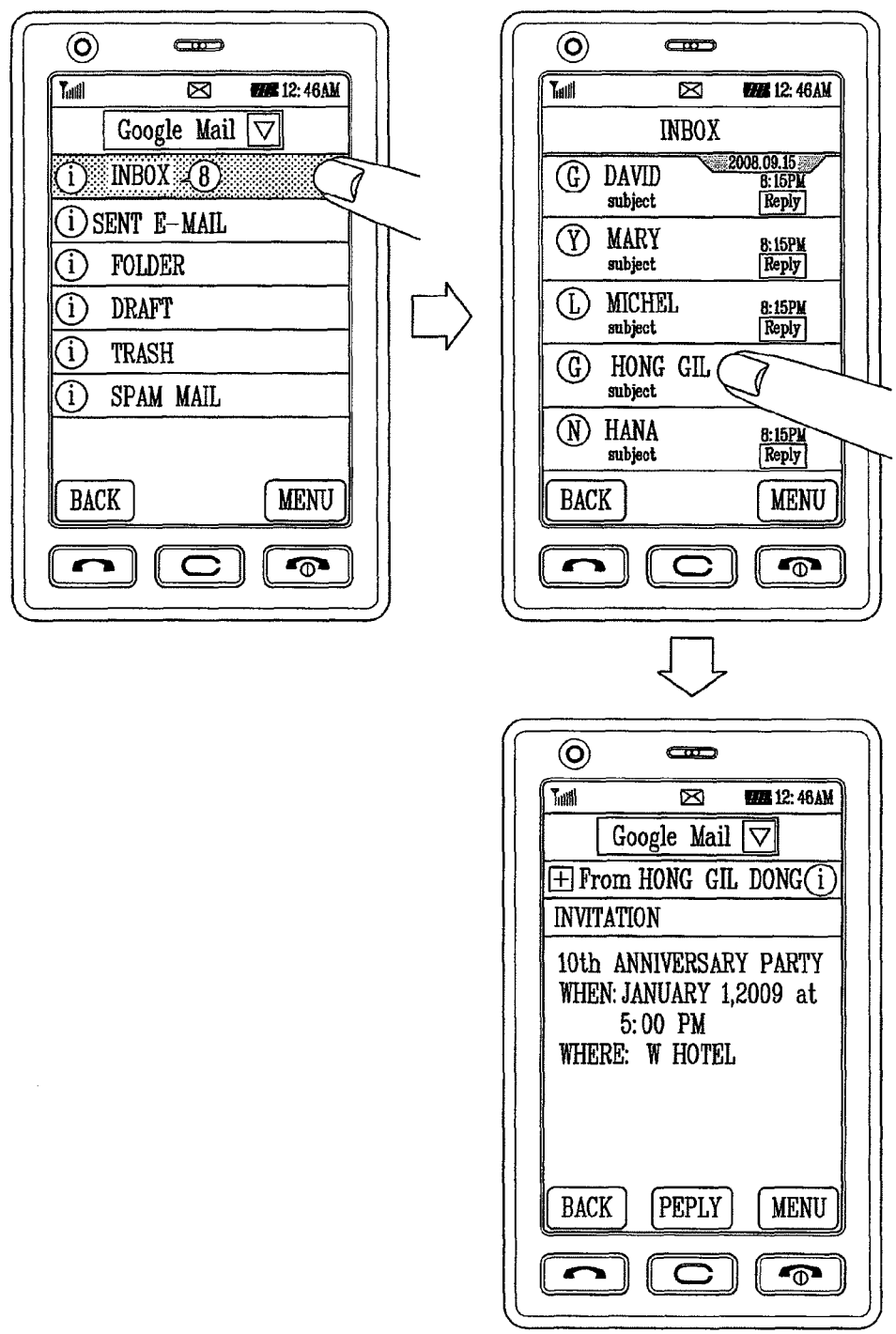

FIGS. 8A to 8C are overviews of display screens illustrating e-mail management of the mobile terminal according to an exemplary embodiment of the present invention.

With reference to FIG. 8A, when the e-mail menu is executed, the mobile terminal 100 accesses a mail server of an account set as a representative account and downloads mails received by the mail box of the corresponding account. When downloading of the mails received by the mail box is completed, the mobile terminal 100 displays the number of newly received mails. For example, as illustrated, the mobile terminal 100 indicates the number of newly received mails at one side of the inbox item.

Thereafter, when a different account is selected through the account changing interface, the controller 180 downloads mails newly received by the mail box of the corresponding account from the mail server of the selected account and displays the number of newly received mails (not-yet-read mails).

As shown in FIG. 8B, when the e-mail function is executed, the controller 180 receives mail box information from the mail servers of the respective accounts registered to the mobile terminal 100 and collectively displays the received mail box information of each account. In other words, the controller 180 sequentially accesses the main servers of the accounts registered to the terminal and downloads mails received by the mail boxes of the mail servers of the accounts. And then, the controller 180 checks the number of mails received by each account, sums up the numbers of the received mails of each account to calculate the total number of the mails received by the accounts registered to the mobile terminal, and displays the same. One or more accounts may be registered to the mobile terminal 100, and one of the registered accounts may be set as a representative account.

When one of the mail boxes arranged to be displayed is selected, information of each account with respect to the mail box is displayed. For example, when the 'inbox' is selected, the controller 180 displays the list of previously registered accounts, checks the number of mails newly received by the respective accounts, and displays the checked number at one side of the names of the corresponding accounts.

Alternatively, as shown in FIG. 8C, the controller 180 displays the list of mails received by all the accounts. In this case, the controller 180 may also display an icon, an indicator, or the like, indicating through which account the mails have been received, as well as the mail list.

When one of the displayed mails on the list is selected, the controller 180 opens the selected mail and displays it on the display screen. While the mail is being displayed, if a different account is selected through the account changing interface, the controller 180 downloads mail box information of the selected account and displays it.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method for a mobile terminal managing a plurality of e-mail accounts, the method comprising:
   displaying an e-mail menu screen that contains a list of a plurality of e-mail accounts previously registered to the mobile phone in response to an input for executing an email function;
   communicating with one or more e-mail servers related to the plurality of e-mail accounts to retrieve mail box information for each e-mail account;
   displaying a total number of any newly received or not-yet-read e-mails of each said e-mail account as icons appearing next to each said e-mail account;
   simultaneously displaying a list of e-mail messages listed for a first e-mail account and icons for replying to the list of e-mail messages individually when the first e-mail account is selected for processing among the plurality of e-mail accounts;
   generating a message writing screen of the first e-mail account for a return email to a particular e-mail message among the list of e-mail messages when an icon for replying to the particular e-mail message is selected from the icons for replying to the list of e-mail messages individually;
   setting a second e-mail account among the plurality of e-mail accounts for transmitting the return email when the second e-mail account is selected for processing among the plurality of e-mail accounts through an account changing interface displayed on the message writing screen; and
   transmitting the return email via the second e-mail account in response to an input thereof.

2. The method of claim 1, further comprising:
   displaying a back icon configured to go back to a previous screen or menu upon selection thereof.

3. The method of claim 1, wherein communicating with the one or more e-mail servers is based on a polling e-mail service in which the e-mail servers are accessed periodically.

4. The method of claim 1, wherein communicating with the one or more e-mail servers is based on a push e-mail service in which e-mails are received from the e-mail servers whenever new e-mails are received at the e-mail servers.

5. The method of claim 1, wherein the e-mail account changing interface comprises a selectable icon in the shape of an arrow or triangular direction indicator.

6. The method of claim 1, wherein the account changing interface is configured to list the plurality of email accounts in a list format.

7. A mobile terminal for managing a plurality of e-mail accounts, the mobile terminal comprising:
   a wireless communication unit configured to support wireless communications;
   a user input unit configured to receive an input from a user to execute an e-mail function;
   an output unit configured to output information to the user;
   a controller cooperating with the wireless communication unit, the user input unit, and the output unit, and configured to:
   display, via the output unit, an e-mail menu screen that contains a list of a plurality of e-mail accounts previously registered by the user in response to an input for executing the email function; and
   communicate, via the wireless communication unit, with one or more e-mail servers related to the plurality of e-mail accounts to retrieve mail box information for each e-mail account;
   display, via the output unit, a total number of any newly received or not-yet-read e-mails of each said e-mail account next to each said e-mail account;
   simultaneously display, via the output unit, a list of e-mail messages listed for a first e- mail account and icons for replying to the list of e-mail messages individually when the first e-mail account is selected for processing among the plurality of e-mail accounts;
   generate, via the output unit, a message writing screen of the first e-mail account for a return email to a particular e-mail message among the list of e-mail messages when an icon for replying to the particular e-mail message is selected from the icons for replying to the list of e-mail messages individually;
   set a second e-mail account among the plurality of e-mail accounts for transmitting the return email when the second e-mail account is selected for processing among the plurality of e-mail accounts through an account changing interface displayed on the message writing screen; and transmit, via the wireless communication unit, the return email via the second e-mail account in response to an input thereof.

8. The mobile terminal of claim 7, wherein the controller is further configured to cooperate with the output unit to display a back icon that allows the user to go back to a previous screen or menu upon selection thereof.

9. The mobile terminal of claim 7 wherein communicating with the one or more e-mail servers is based on a polling e-mail service in which the e-mail servers are accessed periodically.

10. The mobile terminal of claim 7, wherein communicating with the one or more e-mail servers is based on a push e-mail service in which e-mails are received from the e-mail servers whenever new e-mails are received at the e-mail servers.

11. The mobile terminal of claim 7, wherein the e-mail account changing interface comprises a selectable icon in the shape of an arrow or triangular direction indicator.

12. The mobile terminal of claim 7, wherein the controller is further configured to generate the account changing interface with the plurality of email accounts in a list format.

* * * * *